United States Patent Office 2,719,181
Patented Sept. 27, 1955

2,719,181

STABILIZATION OF CHLORINATED HYDROCARBONS WITH 2-HYDROXY-2-METHYL-3-BUTANONE

Gordon E. Cole, Jr., Cos Cob, Conn., assignor to Air Reduction Company, Incorporated, New York, N. Y., a corporation of New York No Drawing. Application August 16, 1954,
Serial No. 450,239

13 Claims. (Cl. 260—652.5)

This invention relates to the stabilization of chlorinated hydrocarbons. More particularly, it relates to the stabilization of chlorinated hydrocarbon solvents such as trichlorethylene and perchlorethylene.

The chlorinated hydrocarbons find wide commercial application as solvents for greases and other organic substances. For example, chlorinated hydrocarbons are used extensively in degreasing metallic articles, extracting caffein from coffee, and in dry cleaning. While chlorinated solvents are recognized to be of great value for these and other purposes, their use is accompanied by a serious drawback. It is known that when these chlorinated hydrocarbon solvents are exposed to heat, light, and air, they tend to decompose with the formation of products, usually acidic materials, having objectionable properties. It is also known that this decomposition reaction is accelerated by the presence of metallic particles such as iron or aluminum. While the acidity developed is relatively small on a percentage basis, even relatively small amounts of acid substances can not be tolerated since the solvents normally are shipped in metallic containers and come into contact with metallic apparatus. In addition, the presence of acidic materials is detrimental to fabrics and to many dyes. Furthermore, the formation of acid products is cumulative since the solvents are normally used over and over again.

Many attempts have heretofore been made to either prevent the decomposition of chlorinated solvents or add chemical substances to such solvents to react with or neutralize the objectionable substances formed by the decomposition of such solvents. Since the chemical mechanism of this decomposition reaction is not definitely known, nor fully understood, stabilizing action must be determined empirically.

It is an object of this invention to provide an effective stabilizer for chlorinated hydrocarbons such as trichlorethylene, and perchlorethylene, which is effective in small concentrations, and which does not develop an objectionable odor. Other objects will in part appear in, and in part be obvious from, the following detailed description.

It has now been discovered that the compound, 2-hydroxy-2-methyl-3-butanone, is particularly suitable for stabilizing these chlorinated solvents and is especially effective in stabilizing trichlorethylene and perchlorethylene. This compound may be represented by the structural formula

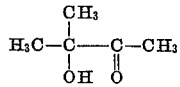

This compound is particularly useful for inhibiting metal-induced degradation of chlorinated hydrocarbons. Therefore, composition stabilized with 2-hydroxy-2-methyl-3-butanone are especially useful in degreasing metallic articles.

In general, the proportion of 2-hydroxy-2-methyl-3-butanone added to the chlorinated solvent may range from as low as about 0.01 per cent by weight to about 1.0 per cent by weight. The amount of stabilizer added will depend upon the particular solvent to be stabilized, the intended use of the solvent composition, and the degree of stability desired.

For many applications it may be desirable to combine the 2-hydroxy-2-methyl-3-butanone with other stabilizers. For example, it may be admixed with alkaline-reacting materials such as inorganic alkaline-earth oxides, e. g. calcium carbonate, or organic amines, e. g. pyridine or triethylamine; phenolic materials such as thymol, resorcinol, catechol or p-tert. butylphenol; unsaturated materials such as diisobutylene; and pyrroles such as N-methyl pyrrole and pyrrole.

While the use of 2-hydroxy-2-methyl-3-butanone is most effective with trichlorethylene and perchlorethylene, it may also be used to stabilize other chlorohydrocarbons such as methylene chloride, chloroform, methyl chloroform, ethylene dichloride, trichlorethane, vinylidene chloride, vinyl chloride, and others.

The stabilizer of this invention, 2-hydroxy-2-methyl-3-butanone, may be prepared by the direct hydration of 3-methyl-1-butyn-3-ol in the presence of a catalytic mixture of mercuric oxide and sulfuric acid in the manner described by G. F. Hennion, R. B. Davis, and D. E. Maloney in the Journal of the American Chemical Society, vol. 71, p. 2813 et seq. (1949). The compound may also be prepared by the hydrolysis of 3,3-dimethoxy-2-methyl-butan-2-ol with dilute sulfuric acid as more fully described in the article by J. F. Froning and G. F. Hennion in the Journal of the American Chemical Society, vol. 62, pp. 653–655 (1940).

The process of stabilization comprising admixing a small, but stabilizing amount, for instance 0.01 to 1.0 per cent by weight, of 2-hydroxy-2-methyl-3-butanone with the chlorinated hydrocarbon solvent. For example, a stabilized mixture of trichloroethylene may be made up by admixing 0.1 per cent by weight of 2-hydroxy-2-methyl-3-butanone with said trichlorethylene.

The term "stabilize," in its various forms, as used in the foregoing specification and the appended claims, is intended to refer to the inhibition of the decomposition reaction and/or the neutralization of any deleterious decomposition products.

What is claimed is:

1. A composition of matter comprising a chlorinated hydrocarbon and a small but stabilizing amount of 2-hydroxy-2-methyl-3-butanone.

2. A composition of matter comprising a chlorinated hydrocarbon solvent and a small but stabilizing amount of 2-hydroxy-2-methyl-3-butanone.

3. A composition of matter comprising a chlorinated hydrocarbon solvent selected from the group consisting of trichlorethylene and perchlorethylene and a small but stabilizing amount of 2-hydroxy-2-methyl-3-butanone.

4. A composition of matter comprising trichlorethylene and a small but stabilizing amount of 2-hydroxy-2-methyl-3-butanone.

5. A composition of matter comprising perchlorethylene and a small but stabilizing amount of 2-hydroxy-2-methyl-3-butanone.

6. A composition of matter comprising a chlorinated hydrocarbon solvent selected from the group consisting of trichlorethylene and perchlorethylene and between about 0.01 per cent to about 1.0 per cent by weight of 2-hydroxy-2-methyl-3-butanone.

7. A composition of matter comprising trichlorethylene and between about 0.01 per cent to about 1.0 per cent by weight of 2-hydroxy-2-methyl-3-butanone.

8. A composition of matter comprising perchlorethylene and between about 0.01 per cent to about 1.0 per cent by weight of 2-hydroxy-2-methyl-3-butanone.

9. The process for stabilizing a chlorinated hydrocarbon solvent which comprises admixing a small but stabilizing amount of 2-hydroxy-2-methyl-3-butanone with said chlorinated hydrocarbon solvent.

10. The process for stabilizing trichlorethylene which comprises admixing a small but stabilizing amount of 2-hydroxy-2-methyl-3-butanone with said trichlorethylene.

11. The process for stabilizing perchlorethylene which comprises admixing a small but stabilizing amount of 2-hydroxy-2-methyl-3-butanone with said perchlorethylene.

12. The process for stabilizing trichlorethylene which comprises admixing from about 0.01 per cent to about 1.0 per cent by weight of 2-hydroxy-2-methyl-3-butanone with said trichlorethylene.

13. The process for stabilizing perchlorethylene which comprises admixing from about 0.01 per cent to about 1.0 per cent by weight of 2-hydroxy-2-methyl-3-butanone with said perchlorethylene.

No references cited.